Patented Feb. 20, 1940

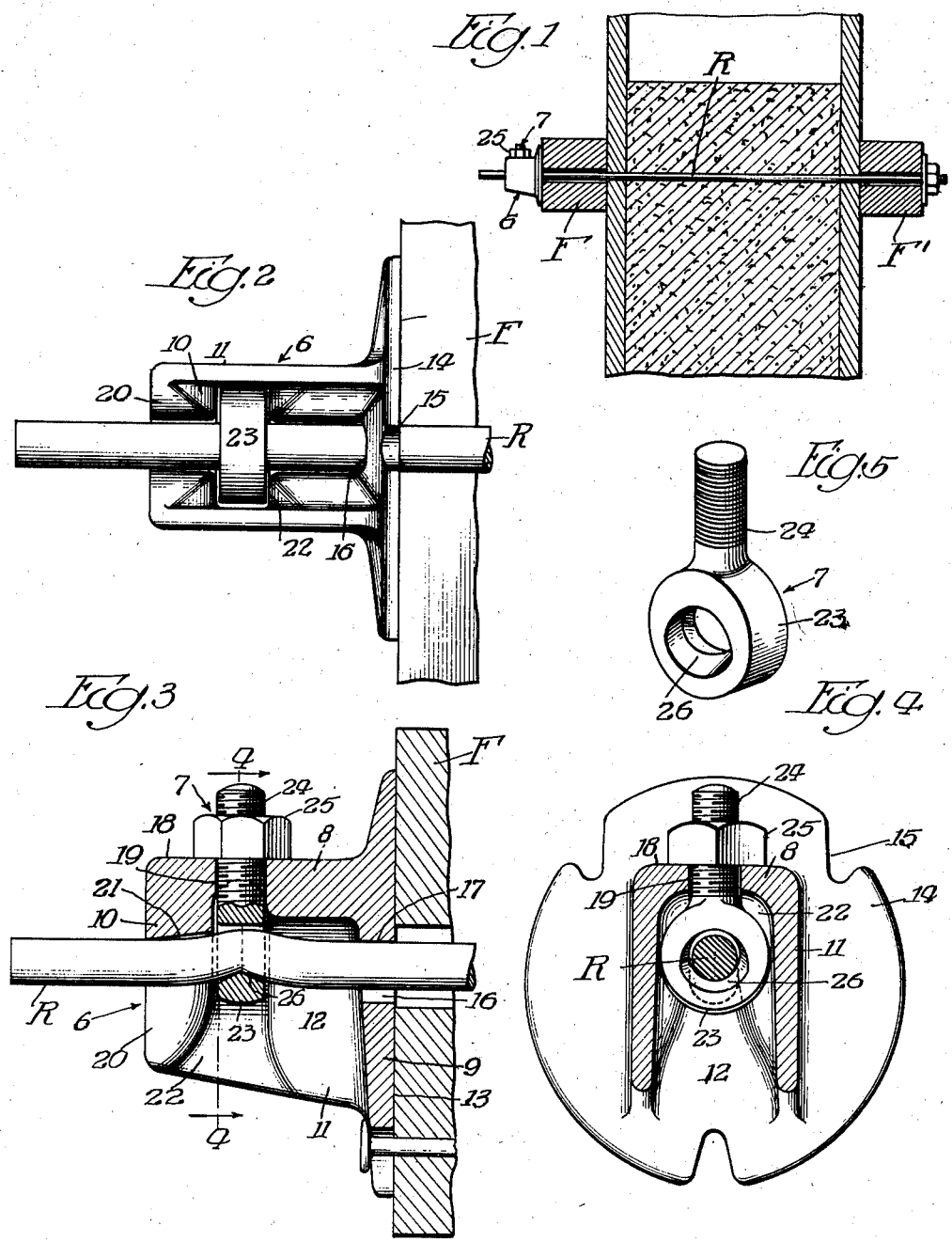

2,190,838

UNITED STATES PATENT OFFICE 2,190,838

ROD CLAMP

Bror Hillberg, Chicago, Ill., assignor to Superior Concrete Accessories, Inc., Chicago, Ill., a corporation of Illinois Application January 20, 1939, Serial No. 251,935

4 Claims. (Cl. 24—125)

The present invention relates generally to clamps for use in tying or holding against separation forms for concrete walls or like structures. More particularly the invention relates to that type of clamp which is known commercially as a rod clamp, is adapted to be applied to one end of a rod extending between and through the forms, and comprises (1) a hollow horizontally elongated clamping bracket which is adapted to have the inner end wall thereof fit or abut against the outer face of the form through which the one end of the rod extends, and has aligned apertures in its inner and outer end walls for permitting passage of said one end of the rod therethrough; and (2) an elongated threaded element which is associated with and extends through one of the horizontal walls of the clamping bracket and is adapted upon axial shift thereof to force said one end of the rod into clamped relation with parts of the aperture defining portions of the inner and outer end walls and in addition to kink or bend the portion of said one end of the rod between the inner and outer end walls of the clamping bracket in order firmly to lock the clamping bracket against longitudinal movement with respect to the rod and in abutment with the contiguous form.

One object of the invention is to provide a rod clamp of this type which is an improvement upon, and is more efficient than, previously designed clamps of the same general character by reason of the fact that it is so designed that when the threaded element is in its operative position the clamping bracket is more securely locked to the rod and slippage of the bracket relatively to the rod is effectively eliminated.

Another object of the invention is to provide a rod clamp of the aforementioned type in which the aperture in the outer end wall of the clamping bracket is in the form of an inverted V-shaped notch and hence permits of ready removal of the bracket from the adjacent end of the rod after loosening of the elongated threaded element, and in which said element is in the form of an eyebolt, the shank of which extends upwardly through a hole in the top wall of the bracket and embodies a nut for shifting or take-up purposes.

A further object of the invention is to provide a rod clamp of the type and character under consideration in which the side portions of the eye of the eyebolt fit within grooves in the inner faces of the side walls of the bracket so that the bolt in addition to being supported or reinforced against transverse bending is effectively held against turning and hence threading of the rod through the eye is facilitated and there is no possibility of the nut during tightening turning the bolt and producing a shearing strain as far as the rod is concerned.

A still further object of the invention is to provide a rod clamp which is generally of new and improved construction and effectively and efficiently fulfills its intended purpose and in which the eye portion or part of the eyebolt is shaped to effect ready kinking or bending of the contiguous portion of the rod without cutting or fracturing the rod.

Other objects of the invention and the various advantages and characteristics of the present rod clamp will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a vertical sectional view of a pair of laterally spaced wall forming forms with a metallic rod therebetween and a clamp embodying the invention applied to one end of the rod;

Figure 2 is an inverted plan view of the clamp illustrating in detail the formation and design of the grooves which are formed in the inner faces of the side walls of the bracket and coact with the side portions of the eye of the bolt to prevent axial turning and transverse bending of the bolt;

Figure 3 is a vertical longitudinal sectional view of the clamp showing the manner in which the eyebolt when tightened operates to draw the bracket encased or enclosed portion of the rod into clamped relation with the portions of the inner and outer end walls of the bracket which define the upper parts of the apertures in such walls, and in addition to kink or bend upwardly the aforementioned portion of the rod;

Figure 4 is a vertical transverse sectional view on the line 4—4 of Figure 3; and Figure 5 is a perspective of the eyebolt of the clamp.

The clamp which is shown in the drawing constitutes the preferred embodiment of the invention. It is of the so-called rod variety or type and is illustrated in Figure 1 in connection with a metallic rod R and a pair of wall forms F and F¹. The forms are disposed in laterally spaced relation and are adapted to have concrete poured therebetween for wall forming purposes. The rod R extends across the space between the two forms and together with the clamp serves to prevent separation of the forms during pouring and hardening of the concrete. One end of the rod extends through the form F¹ and is anchored to the latter in any suitable manner. The other end of the rod extends through the form F and has the clamp applied thereto. The clamp is of two piece design and consists of a clamping bracket 6 and an eyebolt 7.

The bracket 6 is in the form of a one piece casting of iron or like suitable metal and comprises a top wall 8, an inner end wall 9, an outer end wall 10, and a pair of side walls 11. The inner end wall 9 extends vertically and in substantially parallel relation with the outer end wall 10. It defines with the top wall 8, the inner end wall 10, and the two side walls 11, a cavity or hollow 12 within the bracket 6 and embodies a flat outer face 13 which, as shown in Figures 1, 2 and 3, is adapted to fit flatly against the outer face of the form F. The margin of the inner end wall 9 is extended to form an integral substantially circular flange 14. The latter projects outwardly beyond the top and side walls of the clamping bracket, as shown in Figure 4, and serves to increase the area of the form engaging face 13 and also to reinforce or strengthen the bracket as a whole. Notches 15 are formed in the outer edge of the flange 14 and these are adapted to accommodate nails, screws, or other attaching devices, when it is desired releasably to secure the bracket 6 against the form F, as shown in Figure 3. In order to accommodate the projecting end of the rod R, that is, the end of the rod which projects through and beyond the form F, an aperture 16 is formed in the inner end wall 9 of the bracket. This aperture is elliptical in shape and is positioned slightly beneath the inner or lower face of the top wall 8 and midway between the inner faces of the two side walls 11. It extends completely through the inner end wall 9 and is arranged so that the long axis thereof extends vertically. The portion of the inner end wall 9 which defines the upper end of the elliptical rod receiving aperture 16 forms or constitutes an arcuate shoulder 17 beneath the lower face of the top wall 8. The top wall 8 embodies a flat horizontally extending top face 18, and defines the top of the hollow 12. It is slightly thicker than the inner end wall 9 and the side walls 12 and embodies a vertically extending hole 19. This hole, as shown in Figure 3, is disposed slightly inwardly of the outer end wall 10 and is of substantially uniform diameter from end to end. The outer end wall 10 extends between the outer ends of the side walls 11 and embodies a rod receiving aperture 20. The latter is in the form of an inverted V-shaped notch and is so positioned or arranged that the upper end thereof is in horizontal alignment with the elliptical aperture 16 in the central portion of the inner end wall 9. The upper end of the aperture 20 is curved or rounded and the portion of the inner end wall which defines the upper end of the aperture constitutes a substantially semi-cylindrical shoulder 21 beneath the lower face of the top wall 8. This shoulder is horizontally aligned with the shoulder 17 at the upper end of the elliptical aperture 16, as shown in Figure 3. In applying the clamping bracket 6 to the projecting end of the rod, such end is inserted into the aperture 16 in the central portion of the inner end wall 9 by manipulation of the bracket. Thereafter the bracket is shifted inwards towards the form F in order to cause the projecting end of the rod to pass through the hollow 12 and the aperture 20. After full or complete threading of the projecting end of the rod through the bracket 6, the bracket is shifted inwards so as to bring the outer face 13 of the inner end wall 9 into abutment with the form F. At the conclusion of this operation, nails or other attaching devices are inserted into the notches 15 and then driven into the form in order to hold the bracket in place. The side walls 11 of the bracket define the sides of the hollow 12 and extend between the inner and outer end walls 9 and 10. They depend from and join the side portions of the top wall 8 and have vertically extending grooves 22 in their inner faces. These grooves are aligned with the vertically extending hole 19 in the top wall 8 and have flared lower ends.

The eyebolt 7 comprises a circular eye 23 and an externally threaded shank 24. The shank 24 extends upwardly through the hole 19 in the top wall 8 of the clamping bracket 6 and carries a nut 25 on the upper end thereof. The eye 23 is disposed within the hollow 12 in the bracket and is adapted to surround the portion of the rod R within the hollow, as shown in Figures 2, 3 and 4. The sides of the eye 23 fit and slide vertically in the grooves 22 in the inner faces of the side walls 11 of the bracket. As a result of this, and because the grooves are but slightly wider than the eye, the bolt 7 is free to move or slide vertically but is held against rotation relatively to the bracket. The groove defining portions of the side walls 11 of the bracket provide bearings for the side portions of the eye 23 of the bolt and not only prevent turning of the bolt but also transverse bending of the bolt in response to the application of tension to the rod R. The nut 25 is adapted to bear against the flat top face 18 of the top wall 8 and operates when tightened to draw upwardly the eyebolt 7. When the eye of the eyebolt is in encircling relation with the rod and the nut is tightened, the portions of the rod which underlie the shoulders 17 and 21 are jammed or clamped firmly against such shoulders and the portion of the rod between the shoulders is kinked or bent upwardly within the upper portion of the hollow 12. As a result of the clamping of the rod against the shoulders, and the upward kinking or bending, an effective lock is effected between the clamping bracket 6 and the rod. In order to effect bending of the rod in a ready manner, especially when the rod is of comparatively large diameter, the lower side portions of the eye 23 of the bolt are cut away to form a crescent-like wedge shaped rib 26. This rib constitutes the bottom of the hole or aperture in the eye and forms a knife edge engagement with the bottom portion of the rod R when the nut 25 is tightened in connection with locking of the bracket to the projecting end of the rod.

In applying the clamp to the projecting end of the rod R, that is, the end which projects beyond the form F, the nut 25 on the upper end of the shank 24 of the eyebolt 7 is loosened until the eye of the bolt is in alignment with the aperture 16 in the central portion of the inner end wall 9 and the upper end of the aperture 21 in the outer end wall 10. Thereafter the clamping bracket 6 is brought into threaded relation with the projecting end of the rod R, as heretofore pointed out. In connection with the last mentioned operation, the projecting end of the rod is passed through the eye 23 in the bolt. After nailing of the bracket against the form F, the nut 25 is tightened by way of a wrench or similar turning tool. In connection with upward drawing of the bolt resulting from tightening of the nut, the projecting end of the rod is jammed or clenched against the shoulders 17 and 21, and the portion of the rod between the shoulders is kinked or bent upwards, as hereinbefore set forth. During tightening of the nut the side portions of the eye slide upwards in the slots 22 in the inner faces of the side walls 11 of the bracket and as hereinbefore pointed out coact with the groove defining portions of the side walls in such manner that turning of the bolt is prevented. When after pouring and setting of the concrete between the forms F and F¹ it is desired to remove the clamp it is only necessary to unscrew the nut 25. As soon as the clamping pressure is released by unscrewing of the nut the bracket 6 may be withdrawn from the projecting end of the rod. Withdrawal of the bracket from the kinked or bent projecting end of the rod is facilitated as the result of the aperture in the outer end wall 10 being in the form of an inverted V-shaped notch.

The herein described clamp may be manufactured at a comparatively low and reasonable cost and due to its design or construction effectively and efficiently fulfills its intended purpose. It is extremely durable and also capable of withstanding hard usage. By employing an eyebolt as the elongated threaded element for forcing the rod into clamped relation with the inner and outer end walls of the bracket as contradistinguished from a set screw, drilling and tapping of the bracket is avoided and there is no screw thread as far as the bracket is concerned which is likely to become worn and thus render the bracket useless. By employing as part of the clamp the specific form or type of bracket hereinbefore described, the cost is reduced because of cheapness in producing the casting for the bracket. Another or further advantage resides in the fact that when the clamp is in its operative position the interior of the bracket may be inspected to determine the extent of the kinking action of the eyebolt.

Whereas the clamp has been described in connection with a pair of wall forms F and F¹, it is to be understood it may be used generally as a rod clamp and in connection with other types of forms. It is also to be understood that the invention is not to be restricted to the details set forth, since these may be modified within the scope of the appended claims, without departing from the spirit and scope of the invention.

Having thus described the invention, what I claim as new and desire to secure by Letters Patent is:

1. A clamp adapted for application to a rod having one end thereof projecting through and beyond a form, and comprising a hollow bracket consisting of a top wall, an inner form-engaging end wall, an outer end wall in opposed relation with the inner end wall, and a pair of side walls between the end walls, and having in said inner and outer end walls respectively a substantially elliptical aperture and an inverted V-shaped notch adapted to have the projecting end of the rod extend therethrough and also having a vertical hole extending through said top wall, and an eyebolt having the eye thereof disposed in the bracket and adapted to encircle the rod and its shank extending through the hole and provided at its outer end with a nut adapted to engage the top wall and upon tightening thereof to draw upwardly the eyebolt and cause it to bring the projecting end of the rod into clamped relation with the upper ends of the aperture and notch and to kink or bend upwardly the bracket enclosed portion of said projecting end of the rod and thus to lock the bracket and rod against relative movement.

2. A clamp adapted for application to a rod having one end thereof projecting through and beyond a form, and comprising a hollow bracket consisting of a top wall, an inner form-engaging end wall, an outer end wall in opposed relation with the inner end wall, and a pair of side walls between the end walls and having a pair of aligned apertures in the end walls and beneath the top wall adapted to have the projecting end of the rod extend therethrough and also having a vertical hole extending through the top wall and opposed vertically extending grooves in the inner faces of the side walls in transverse alignment with the hole, and an eyebolt having the eye thereof adapted to encircle the rod and positioned in the bracket and with the sides thereof in such snug sliding engagement with the grooves that it is held against tilting or bending movement in the direction of said end walls, and its shank extending upwardly through the hole and provided at its upper end with a nut adapted to engage the top wall upon tightening thereof to draw upwardly the eyebolt and cause it to bring the projecting end of the rod into clamped relation with the upper ends of the apertures and to kink or bend upwardly the bracket enclosed portion of said projecting end of the rod and thus to lock the bracket and rod against relative movement.

3. A clamp adapted for application to a rod having one end thereof projecting through and beyond a form, and comprising a hollow one-piece cast metal bracket consisting of a top wall with a flat top face, an inner form engaging end wall, an outer end wall in opposed relation with the inner end wall, and a pair of side walls depending from the top wall and extending between the end walls, and having in said inner and outer end walls respectively and beneath the bottom face of the top wall a substantially elliptical aperture and an inverted V-shaped notch adapted to have the projecting end of the rod extend therethrough and also having a vertical hole extending through the top wall and disposed in close proximity to the notch in the outer end wall, and an eyebolt having the eye thereof disposed in the bracket and adapted to encircle the rod and its shank extending upwardly through the hole and provided at its upper end with a nut adapted to engage the flat top wall and upon tightening thereof to draw upwardly the eyebolt and cause it to bring the projecting end of the rod into clamped relation with the upper ends of the aperture and notch and to kink or bend upwardly the bracket enclosed portion of said projecting end of the rod and thus to lock the bracket and rod against relative movement.

4. A clamp adapted for application to a rod having one end thereof projecting through and beyond a form, and comprising a hollow one-piece bracket consisting of a top wall with a flat upper face, an inner form engaging end wall, an outer end wall in opposed relation with the inner end wall and a pair of side walls depending from the top wall and extending between the end walls, and having in the inner and outer end walls respectively and beneath the bottom face of the top wall a substantially elliptical aperture and an inverted V-shaped notch adapted to have the projecting end of the rod extending therethrough and also having a vertical hole extending through said top wall and a pair of oppositely facing vertically extending grooves formed in the inner faces of the side walls and provided with flared lower ends, and an eyebolt having the eye thereof adapted to encircle the rod and positioned in the bracket and with the sides thereof in such snug sliding contact with the side wall notches that it is held against bending or tilting movement in the direction of either end wall, and its shank extending upwardly through the hole and provided at its upper end with a nut adapted to engage the flat top wall and upon tightening thereof to draw upwardly the eyebolt and cause it to bring the projecting end of the rod into clamped relation with the upper ends of the apertures and to kink or bend upwardly the bracket enclosed portion of said projecting end of the rod and thus to lock the bracket and rod against relative movement.

BROR HILLBERG.